(12) United States Patent
Barrett et al.

(10) Patent No.: US 10,722,879 B2
(45) Date of Patent: Jul. 28, 2020

(54) MAGNETIC SEPARATION

(71) Applicant: GenCell Biosystems Ltd., Raheen, County Limerick (IE)

(72) Inventors: Brian Barrett, Cashel (IE); Niall O'Keeffe, Raheen (IE); Brian Chawke, Askeaton (IE); Noel Sirr, Ballymoe (IE)

(73) Assignee: GENCELL BIOSYSTEMS LTD., Raheen, County Limerick (IE)

( * ) Notice: Subject to any disclaimer, the term of this patent is extended or adjusted under 35 U.S.C. 154(b) by 0 days.

(21) Appl. No.: 14/916,946

(22) PCT Filed: Nov. 25, 2014

(86) PCT No.: PCT/IB2014/003106
§ 371 (c)(1),
(2) Date: Mar. 4, 2016

(87) PCT Pub. No.: WO2015/075563
PCT Pub. Date: May 28, 2015

(65) Prior Publication Data
US 2016/0214101 A1     Jul. 28, 2016

Related U.S. Application Data

(60) Provisional application No. 61/908,473, filed on Nov. 25, 2013.

(51) Int. Cl.
*B01L 3/02* (2006.01)
*B01L 3/00* (2006.01)
*G01N 1/40* (2006.01)
*G01N 35/00* (2006.01)

(52) U.S. Cl.
CPC ............ *B01L 3/502* (2013.01); *B01L 3/5025* (2013.01); *B01L 3/561* (2013.01); *G01N 1/40* (2013.01); *B01L 2200/0647* (2013.01); *B01L 2200/141* (2013.01); *B01L 2200/143* (2013.01); *B01L 2300/0838* (2013.01); *B01L 2300/0864* (2013.01); *B01L 2400/049* (2013.01); *B01L 2400/0487* (2013.01); *G01N 35/0098* (2013.01)

(58) Field of Classification Search
CPC ..................... B01L 2400/0406; B01L 3/502
USPC ................................ 422/520, 527
See application file for complete search history.

(56) References Cited

U.S. PATENT DOCUMENTS

| 6,884,357 | B2 | 4/2005 | Siddiqi |
| 9,194,772 | B2 | 11/2015 | Lee et al. |
| 2003/0044968 | A1 | 3/2003 | Lafferty et al. |
| 2006/0121612 | A1* | 6/2006 | Tajima .................. C12M 35/02 435/459 |
| 2011/0088491 | A1* | 4/2011 | Krueger ............. B01F 11/0014 73/863.11 |

(Continued)

FOREIGN PATENT DOCUMENTS

| WO | WO 2007/024778 A2 | 3/2007 |
| WO | WO 2007/024798 A2 | 3/2007 |
| WO | WO 2007/024800 A2 | 3/2007 |

(Continued)

*Primary Examiner* — Natalia Levkovich
(74) *Attorney, Agent, or Firm* — Bret E. Field; Bozicevic, Field & Francis LLP

(57) ABSTRACT

Devices, systems and methods for magnetically separating paramagnetic beads for biomolecule isolation and processing are disclosed.

22 Claims, 12 Drawing Sheets

(56) References Cited

U.S. PATENT DOCUMENTS

2013/0273552 A1  10/2013  Ohashi

FOREIGN PATENT DOCUMENTS

| WO | WO 2007/024914 A2 | 3/2007 |
| WO | 2011047233 A1 | 4/2011 |
| WO | 2012011091 A2 | 1/2012 |
| WO | 2012095369 A1 | 7/2012 |
| WO | 2013111016 A2 | 8/2013 |
| WO | 2014083435 A2 | 6/2014 |
| WO | 2014188281 A2 | 11/2014 |
| WO | 2014207577 A2 | 12/2014 |
| WO | 2015075560 A2 | 5/2015 |
| WO | 2015120398 A2 | 8/2015 |
| WO | 2016020837 A2 | 2/2016 |
| WO | 2016020838 A1 | 2/2016 |
| WO | 2016020839 A1 | 2/2016 |

* cited by examiner

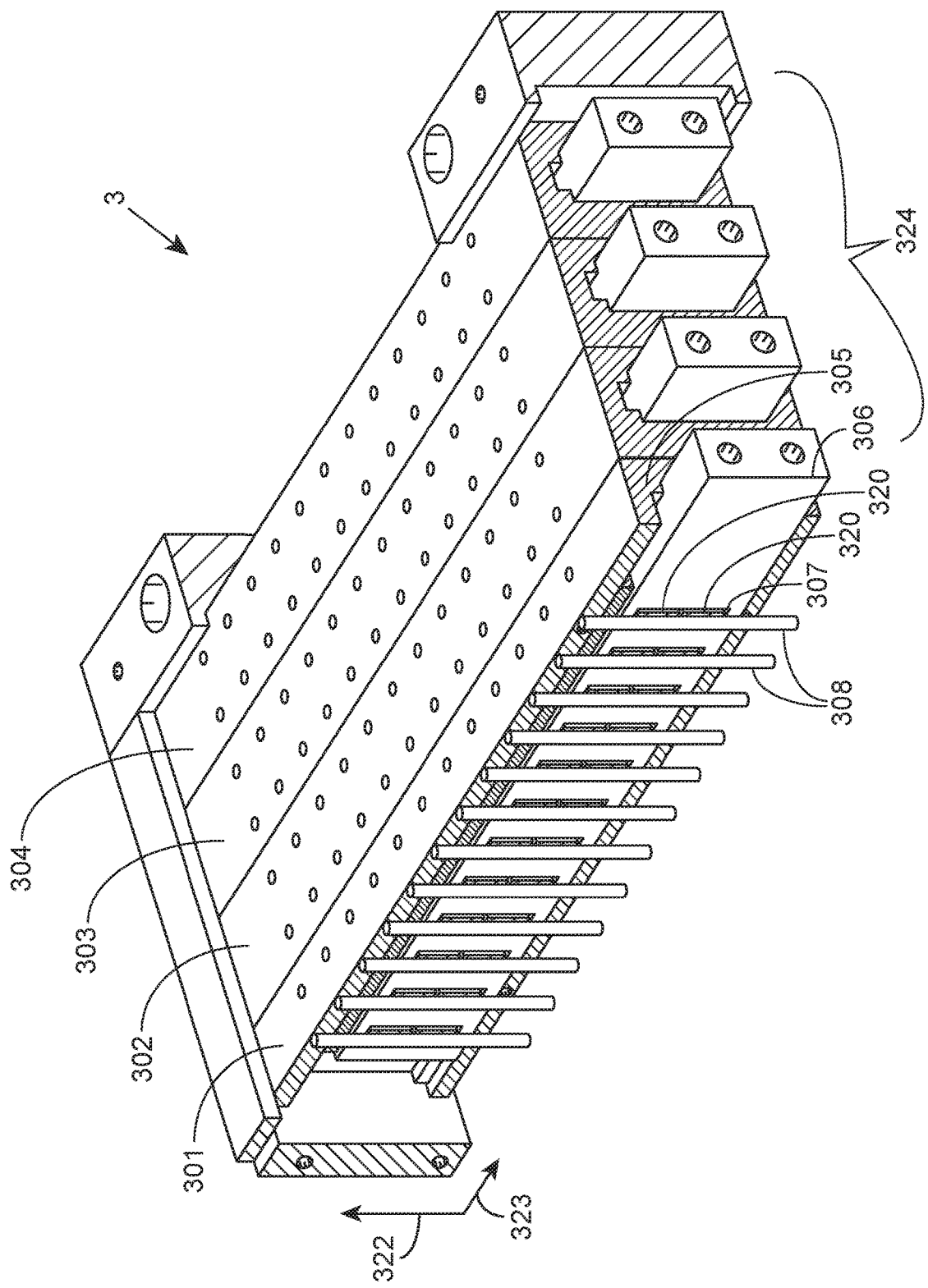

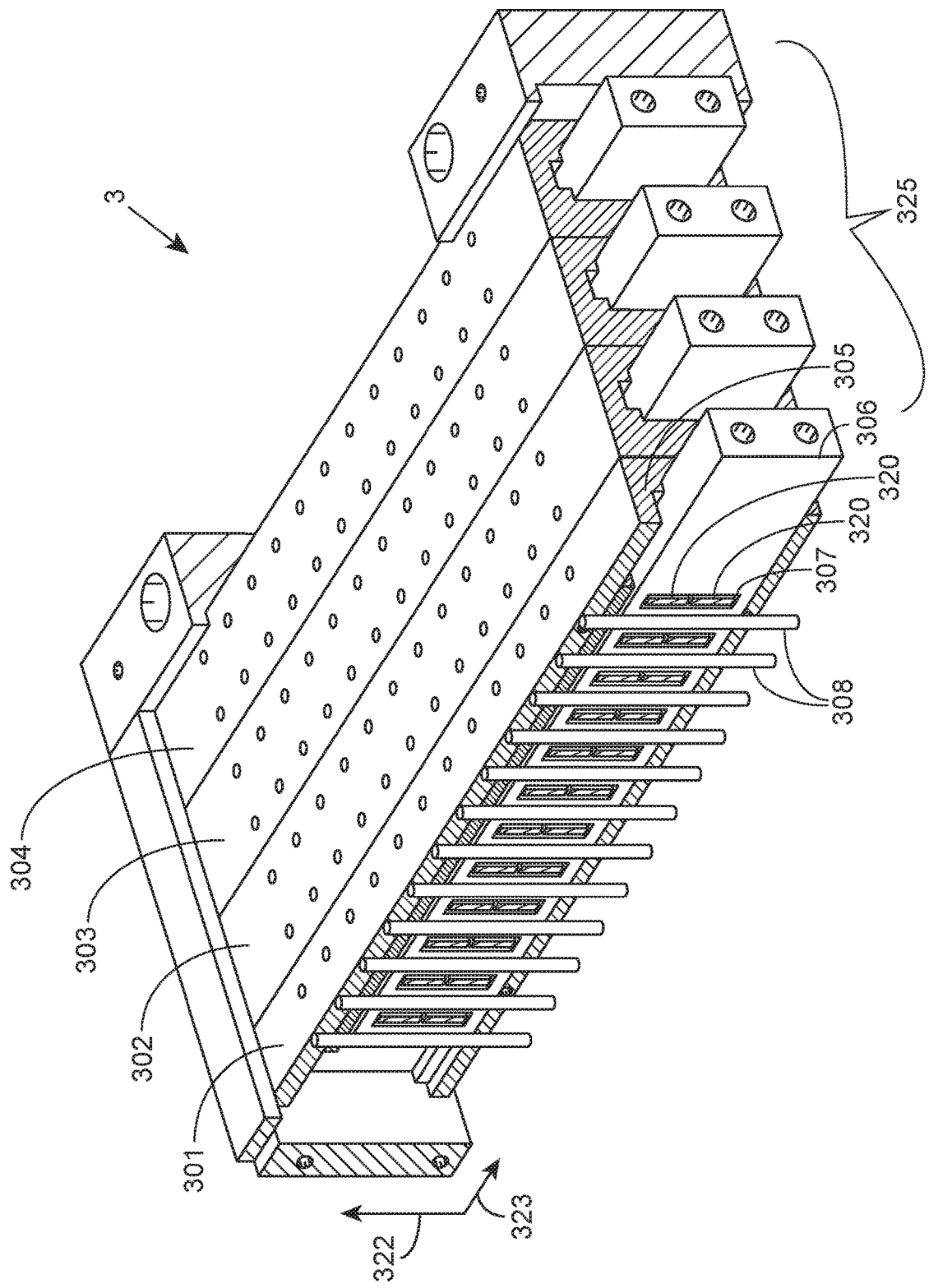

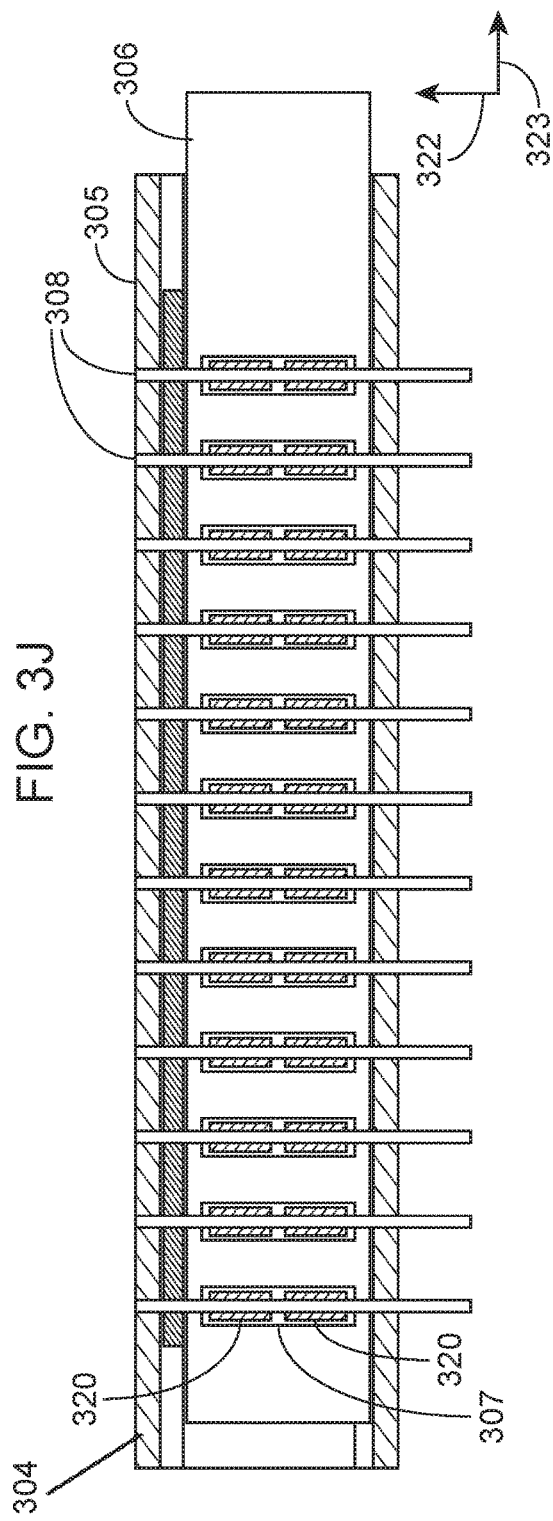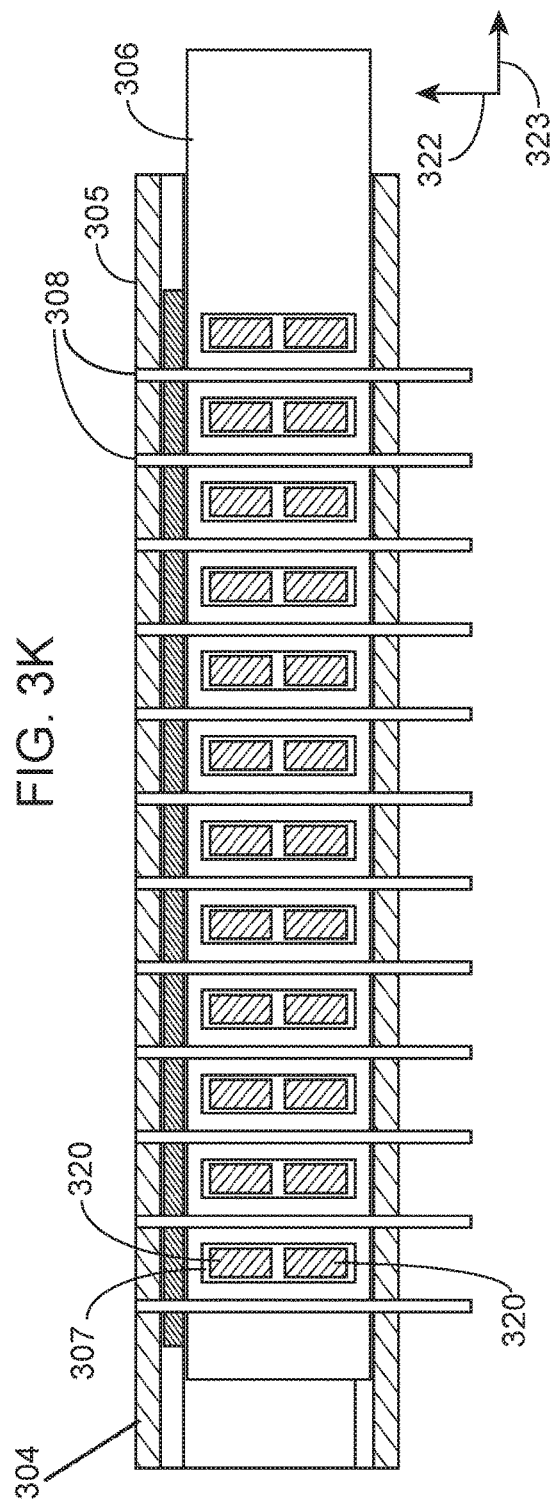

MAGNETIC SEPARATION

CROSS-REFERENCE TO RELATED APPLICATIONS

This application claims the benefit of U.S. provisional patent application Ser. No. 61/908,473 filed 25 Nov., 2013, which is hereby incorporated herein by reference in its entirety.

BACKGROUND

The isolation of biomolecules is a critical part of any sample processing system. For all biochemistry processes the isolation and purification of the sample target is critical to its success. The limitations in biochemistry analysis process—pyro-sequencing, nucleic acid ligation, polymerase chain reaction, digital PCR, qPCR, nucleic acid sequencing, protein detection/protein enrichment, genetic bead coating, rare cell detection and cell enrichment—and not limited to these, are due to the starting concentrations of the target and the level of biochemical inhibitors present within the reaction sample used in the analysis.

For most biochemistry analysis a series of pre-analysis steps are performed on the sample to isolate the target from the initial sample and remove biochemistry inhibitors. These steps are typically labour intensive and ultimately reduce the starting concentrations of the target.

One method of sample purification makes use of spin columns. However spin columns require a number of centrifugation steps and hence cannot be integrated with an automated DNA library preparation platform. Similarly, a purification technique for nucleic acid fragment purification from agarose gels also requires centrifugation steps to achieve the nucleic acid isolation.

One technique used for sample purification is paramagnetic bead-based purification. This method offers an approach that can provide improved DNA recovery rates and tunable buffer conditions that can be used to selectively bind specific DNA fragment sizes.

The paramagnetic bead based purification is a static well batch process. The current method involves the pipetting of the bead-mixture—paramagnetic beads and a buffer—into a well of a microtitre plate along with the initial sample. The solution is pipetted, mixed, and incubated at room temperature to allow the DNA to bind to the beads. The microtitre plate is then placed onto a magnetic plate. The beads holding the bound DNA move to the edge of the plate and are held by the magnet. Next the supernatant (containing waste) is removed using a pipette and discarded. Following this a number of wash steps are then performed to remove residual waste present on/at the bead pellet. Ethanol is pipetted to the plate containing the bead pellet, incubated and then removed using a pipette. This wash step is repeated twice. An elution buffer is then added. The plate is removed from the magnetic plate and the elution buffer is mixed via pipette mixing. The microtitre plate is placed back onto the magnetic plate. The eluent containing the purified DNA is then withdrawn using a pipette.

The paramagnetic bead based protocol is a labour intensive process and is complicated to automate. The high numbers of pipetting steps also result in large initial and final sample volumes, resulting in high reagent costs per data point.

One application and not limited to this application is for improved sample purification for next generation sequencing platforms. Many next generation sequencing platforms require DNA libraries made up of DNA fragments within a specific range of base pair lengths. In addition, these DNA fragments need to be tagged with specific nucleotide sequences (adapters) to allow the sequences to be amplified using PCR and to allow the library fragments to anneal to the sequencer flow cell. Sequence specific indices can also be added to the DNA fragments to identify individual samples when multiplexing sample within a single flow cell. The tagmentation of DNA (DNA is fragmented and tagged with adapters) and the addition of common adapters and indices are achieved in two separate biological reactions. Following these reactions, the DNA library is cleaned to remove excess nucleotides, enzymes, primers, salts and other contaminants. Consequently, the workflow required to tagment DNA, purify tagmented DNA, add common adapters and indices and purify the final library product is complex and labour intensive.

The systems and methods outlined herein can help achieve sample handling that reduces and in some embodiments removes contamination and may achieve low-volume, high-throughput, low-cost, and/or high in-sample concentration.

SUMMARY

Composite liquid cell handling systems are used to carry out sample processing and therefore often include the capability to magnetically separate target molecules from the surrounding sample. Highly efficient magnetic separation is particularly important in composite liquid cells where the volume of sample and reagent are small and number of target molecules in a single cell may be correspondingly small. Although some specific embodiments described herein are optimized for application to composite liquid cell handling, the devices and methods disclosed are also broadly applicable to systems both with and without composite liquid cells.

Devices, systems and methods for magnetically separating paramagnetic beads for biomolecule isolation and processing are disclosed.

BRIEF DESCRIPTION OF THE DRAWINGS

FIGS. 3A-K illustrate the magnet level of the liquid handling system of FIG. 1.

DETAILED DESCRIPTION

Figure 1:
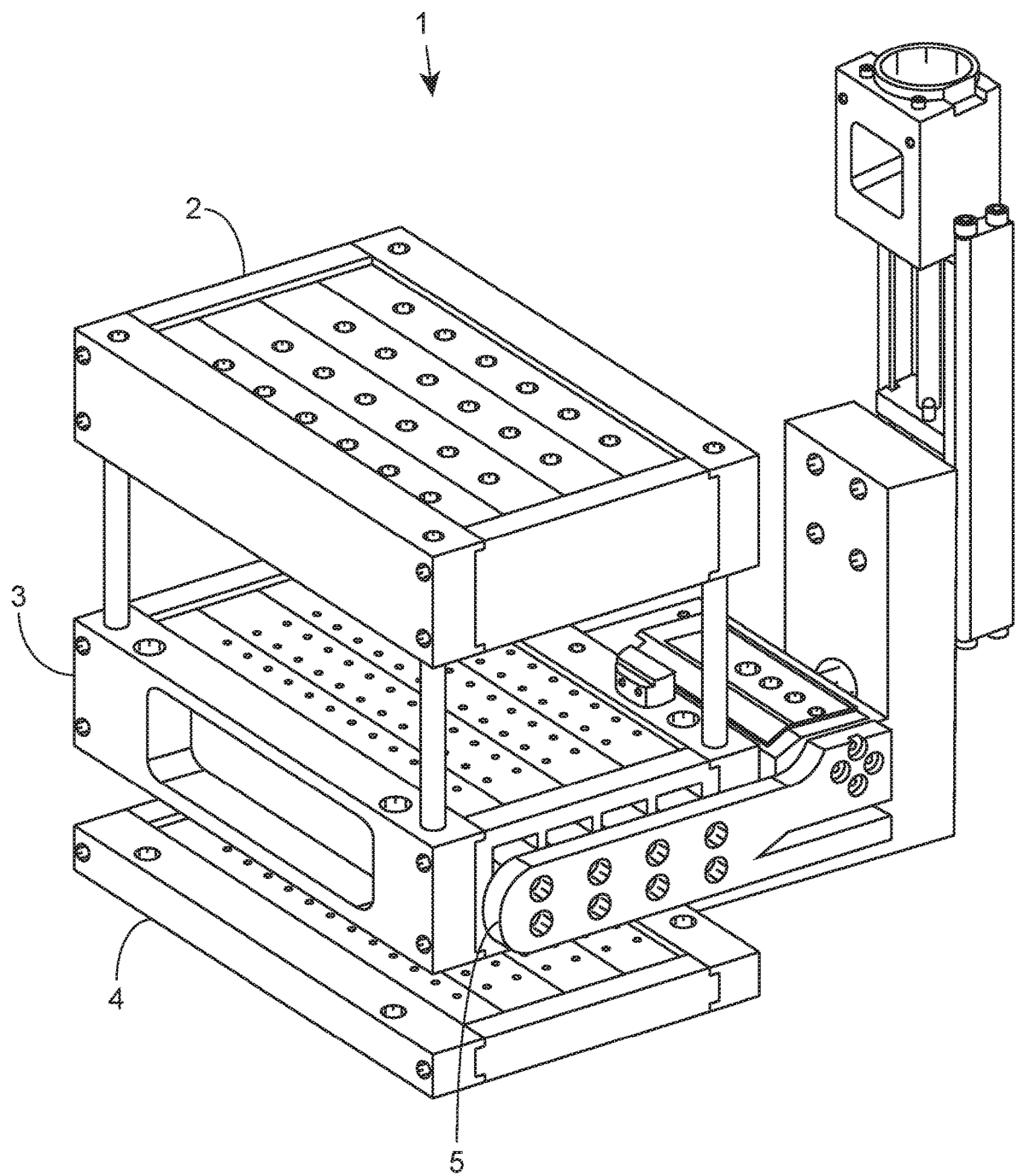
FIG. 1 is a schematic illustration of a liquid handling system.

As explained in previous applications, such as U.S. pat. pub. no. US20120045765, U.S. pat. pub. no. US20130280726, PCT pub. no. WO2012011091. PCT pub. no. WO2013111016. and PCT pub. no. WO2014083435, all of which are hereby incorporated herein by reference in their entirety, composite liquid cells can be created using fluid handling systems. Such a fluid handling system can have a liquid conduit for uptake and dispensing of liquids. The liquid conduits can be moved and aimed at specific locations for uptake and dispensing of fluid from existing composite liquid cells, or to and from other locations or structures.

In some embodiments, it can be advantageous to have a plurality of liquid conduits acting in concert. The liquid conduits may be arranged in any formation, for example, in a line, in a rectangular or Cartesian grid, or hexagonally packed. Each liquid conduit will typically have a working end from which liquids can be dispensed and into which liquids can be drawn. The liquid conduits can be capillary tubes, i.e., having a hydrophilic interior surface and the necessary geometry to draw in aqueous solutions or pure water by capillary action. Alternatively, opposite the working end, the liquid conduits can be attached to a pump capable of creating a negative pressure sufficient to draw in liquids or air. Such a pump may also be configured to create positive pressures to dispense liquid out of the working end of the conduit. A pump may be included regardless of whether the liquid conduits are capable of producing capillary action.

In many biochemical protocols it can be useful or necessary to separate target biomolecules (e.g., DNA) from a larger biological sample. One convenient method for such separation is by binding the target molecules to magnetic beads in solution, applying a magnetic field to immobilize the beads with their bound target molecules, and flowing a wash solution past the immobilized beads to remove the original sample material other than the immobilized bound target molecules. Once the target molecules have been thus isolated, the magnetic field can be removed and the target molecules released for further processing.

Such magnetic separation can be accomplished in a fluid handling system like the one described above. One or more magnets can be associated with each liquid conduit. The magnets can be connected to an actuator or actuators capable of moving each magnet between at least two positions, first a position in which the magnet is spaced away from the liquid conduit, and second a position in which the magnet is juxtaposed to the liquid conduit. In some embodiments, two magnets can be associated with each liquid conduit. The magnets can be spaced apart along the direction of a flow axis of the conduit. Spacing the magnets apart along the flow axis of the conduit can increase the separation efficiency. Any bead not immobilized as it flows past the first magnet will then be flowed past the second magnet. Given a small likelihood that any given bead will fail to be immobilized when passing a single magnet, the likelihood that a bead will fail to be immobilized when passing two magnets will be the even smaller square of that small likelihood. Such increased efficiency can be advantageous when processing composite liquid cells because the volumes involved are so small. Failing to immobilize a small fraction of the magnetic beads is less of a concern when dealing with larger quantities of liquid. Naturally, if even higher efficiency immobilization is desired, three, four, or more magnets in series can be used.

One embodiment of such a fluid handling system is illustrated in FIG. 1. This system 1 has three levels, a manifold level 2, a magnet level 3, and a tube guide level 4. The system is shown without the liquid conduits for clarity.

Figure 2A:
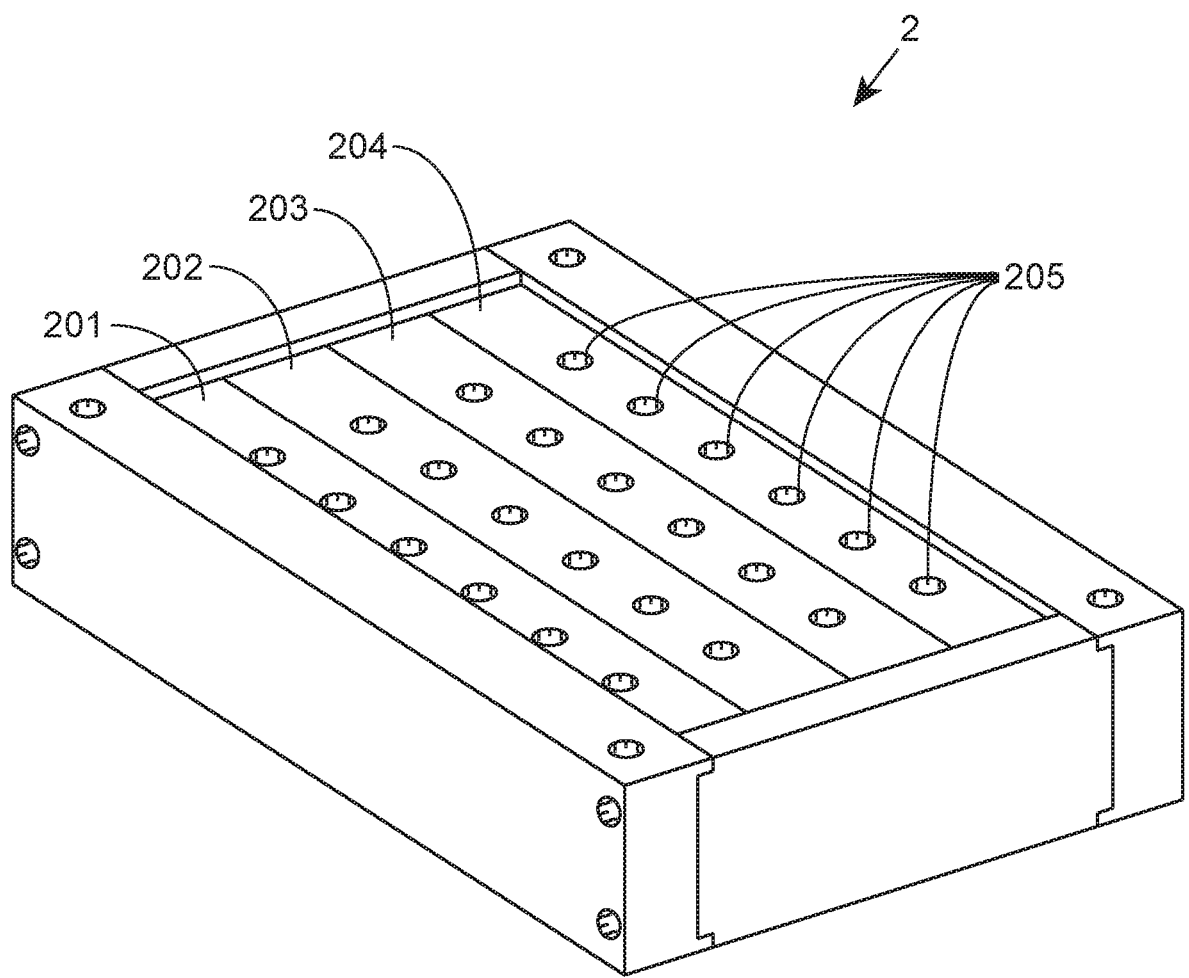
FIGS. 2A-C illustrate the manifold level of the liquid handling system of FIG. 1.
Figure 2B:
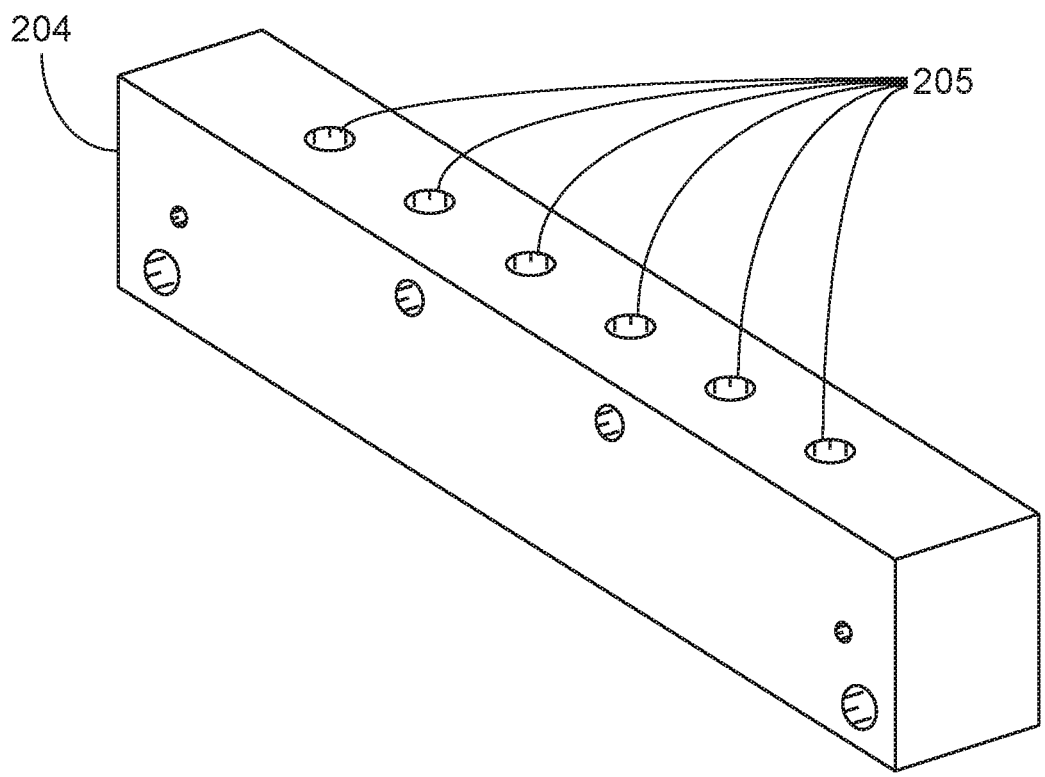
Figure 2C:
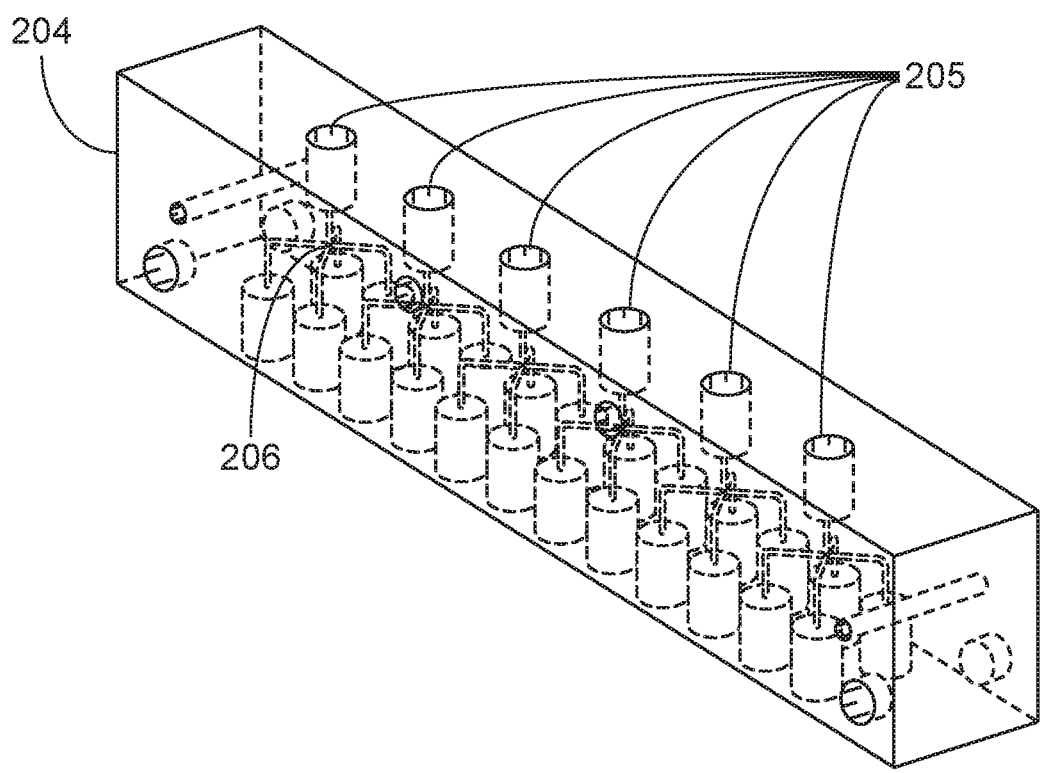

FIG. 2A illustrates the manifold level 2 in isolation. The manifold level 2 includes four generally linear modules 201, 202, 203, 204, each with six input ports 205. FIG. 2B shows a single linear module 204 in isolation with the input ports 205 visible on the top of the module 204. FIG. 2C shows the same linear module 204 with the near wall removed to reveal the interior of the module. Each input port 205 is connected to a branch 206 which divides the fluid path into four output ports. The output ports are positioned on the side of the manifold level 2 facing the magnet level 3. Thus the manifold level 2 separates a total of twenty four input lines into ninety six output lines. While in some embodiments, the manifold can constitute separate linear modules as illustrated, in other embodiments the manifold can be a single element, in some cases a monolithic, or integral, piece. In some embodiments the manifold can be made up of a combination of smaller modules which may or may not be linear as shown in FIGS. 2A-C. The number of ports in a manifold in any given embodiment need not be 96 as shown in the figures, and can be adjusted for a specific application, as can the geometric layout of the input and/or output ports.

Figure 3A:
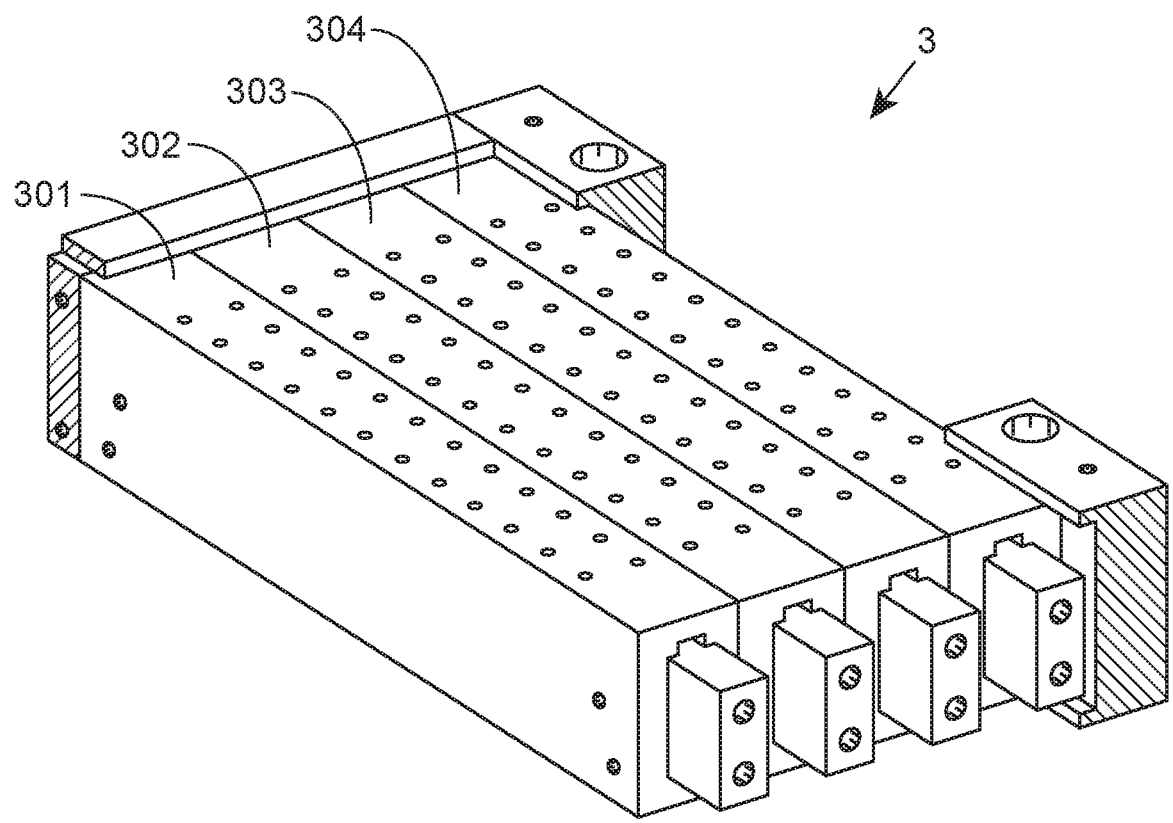
Figure 3B:
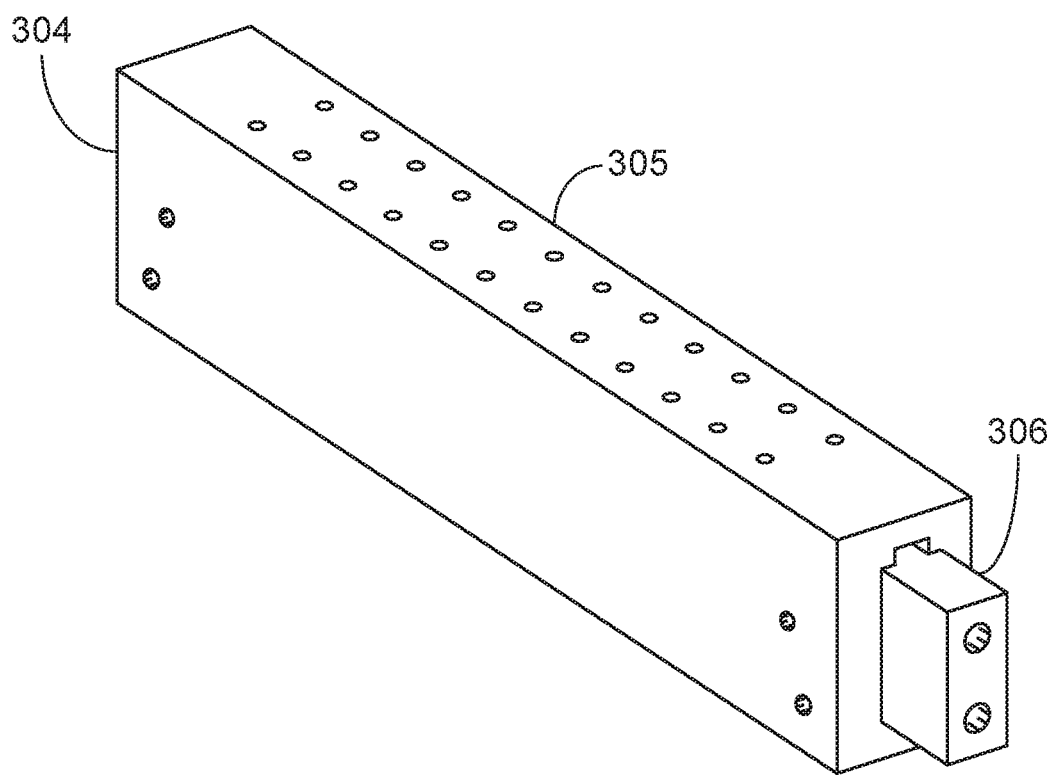
Figure 3C:
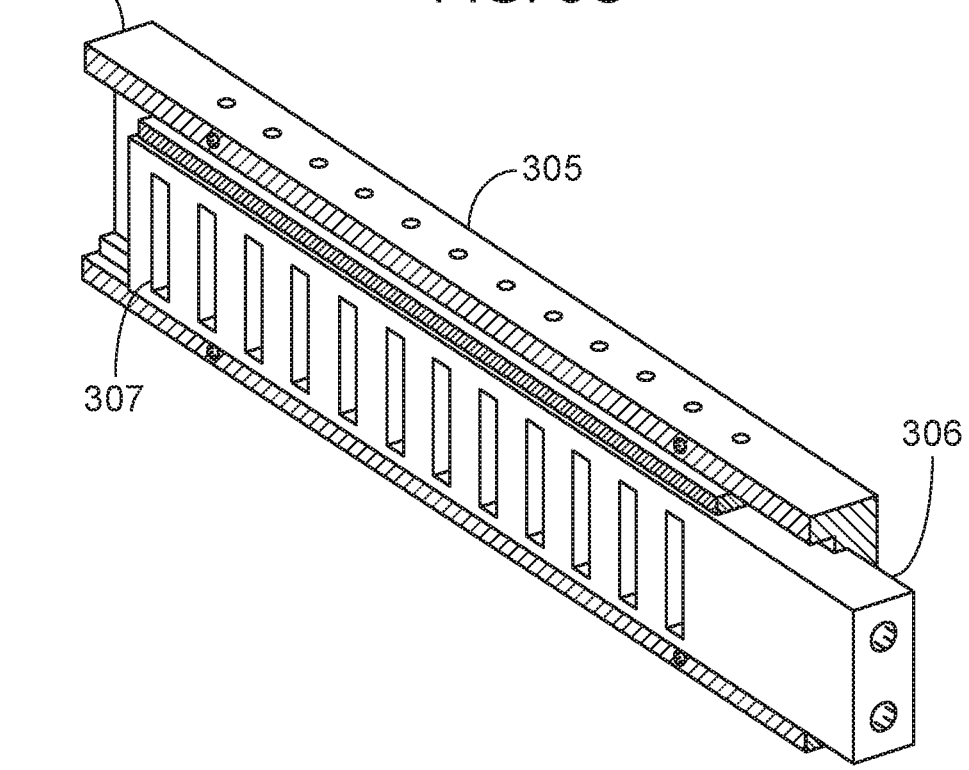
Figure 3D:
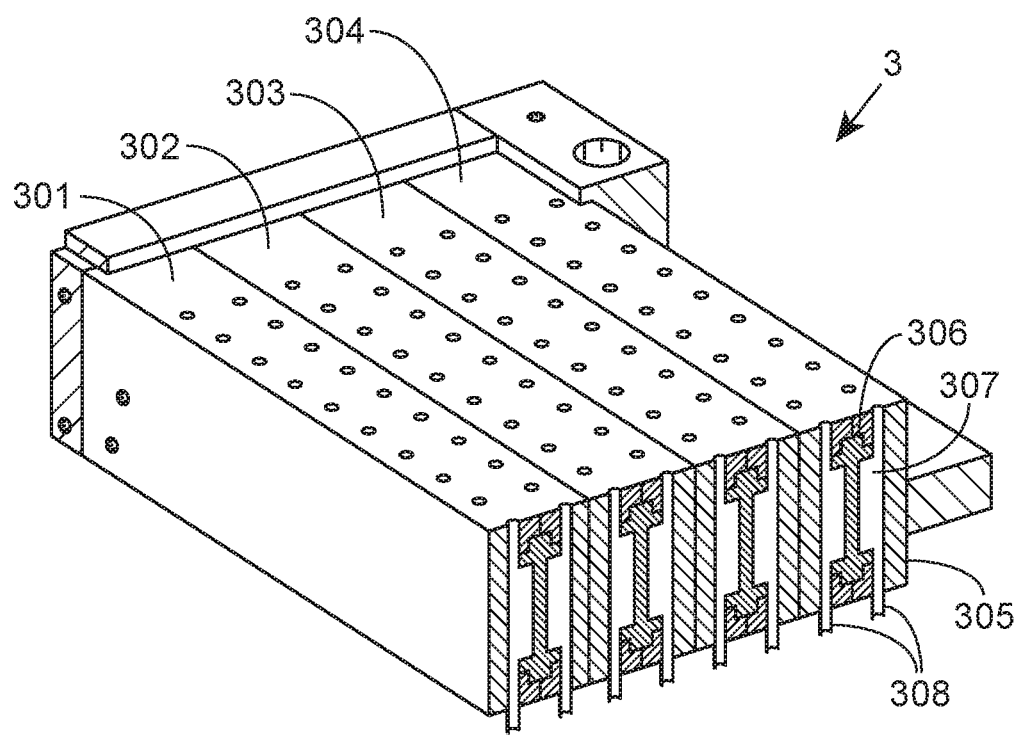
Figure 3E:
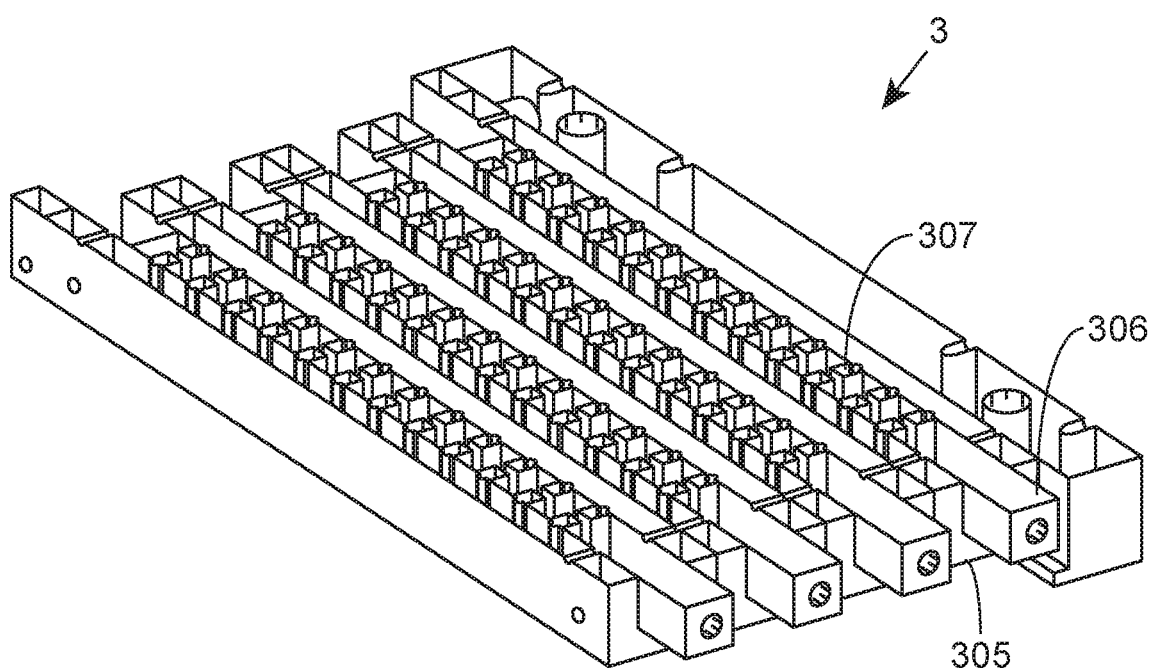
Figure 3F:
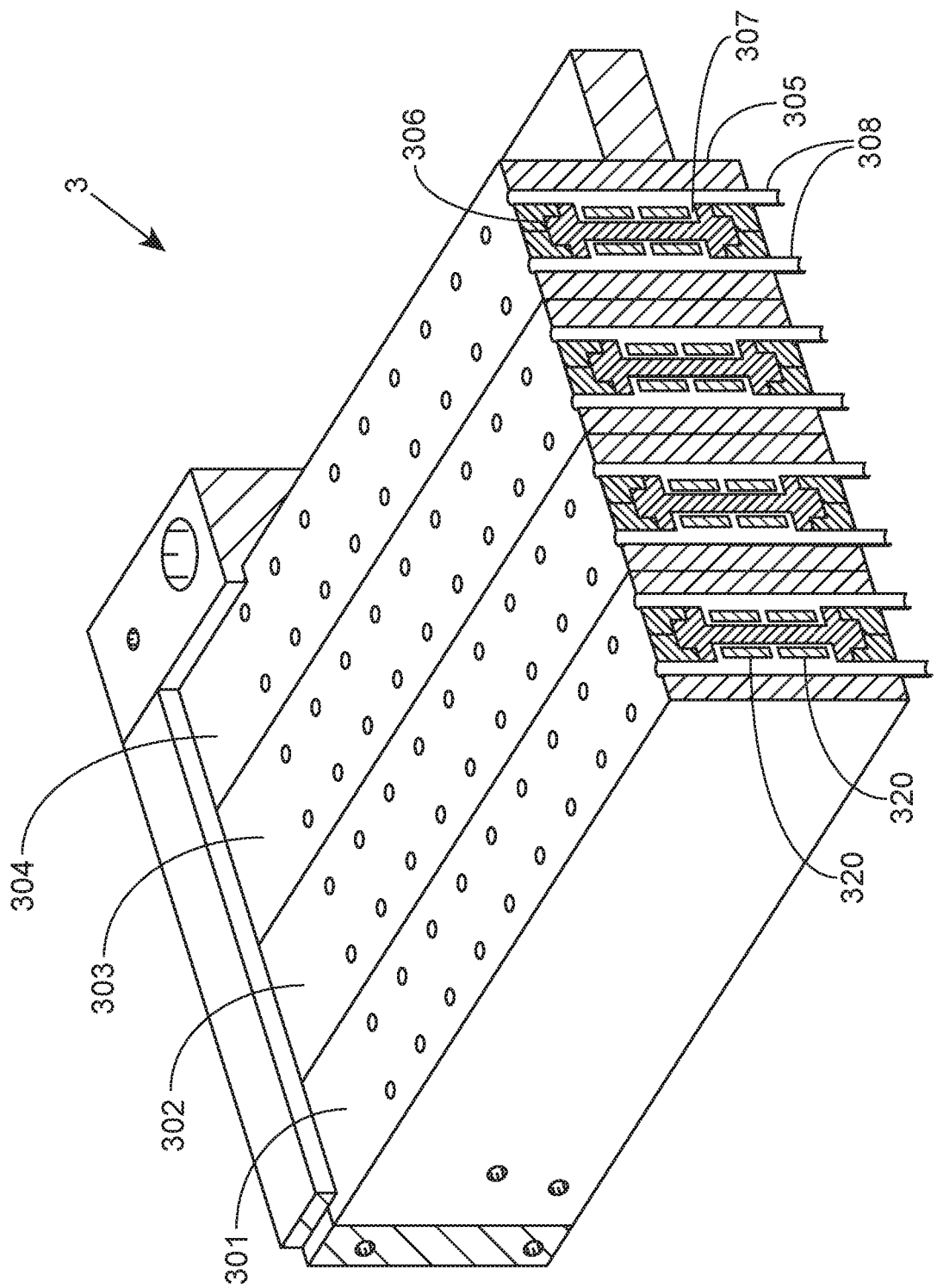
Figure 3G:
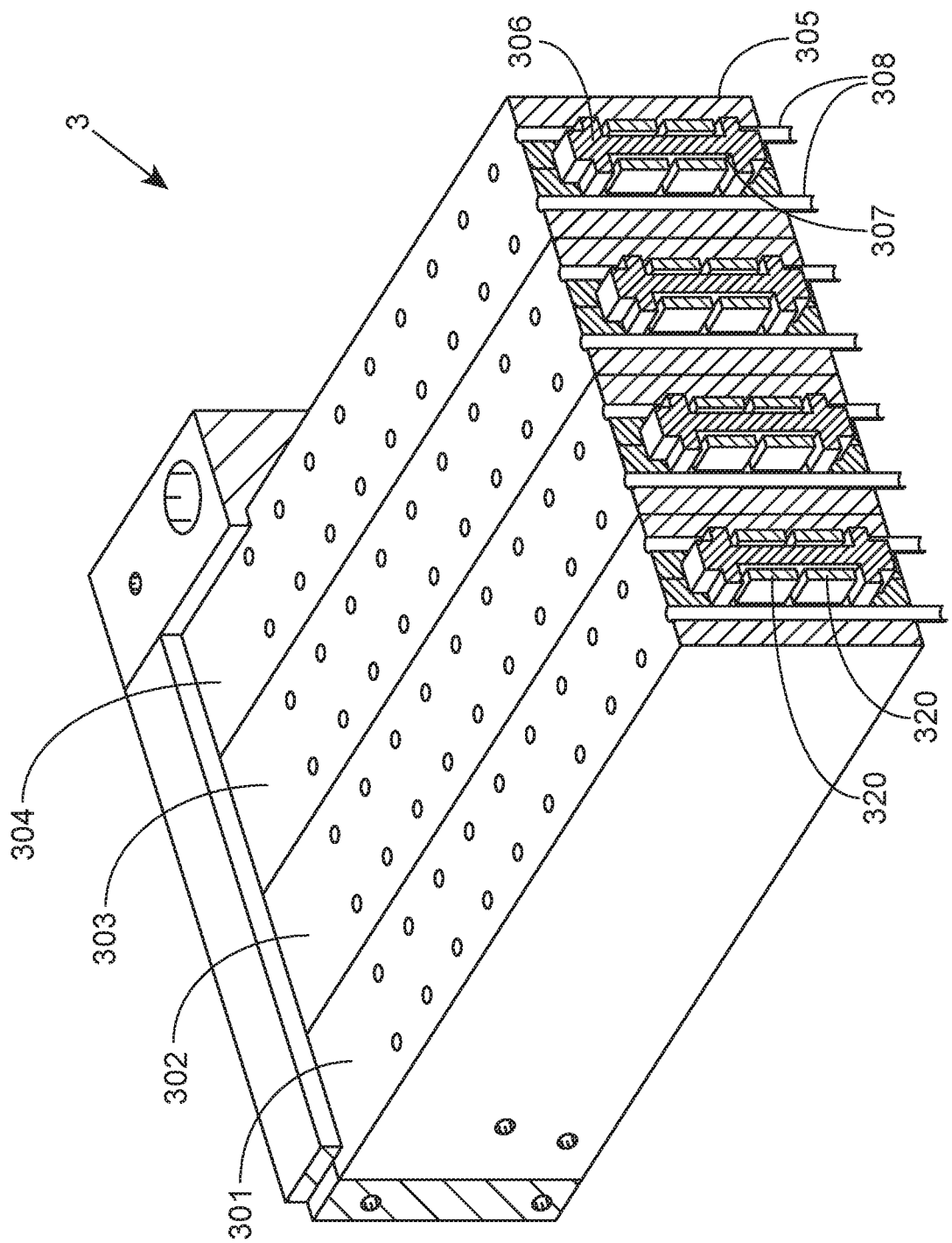

FIG. 3A illustrates the magnet level 3 in isolation. The magnet level 3 includes four twenty four line magnet modules 301, 302, 303, 304. FIG. 3B illustrates a single magnet module 304 in isolation. The magnet module includes a socket 305 and a magnet bolt 306 (i.e. slidably displaceable unit) that is slidably displaceable within the socket 305. FIGS. 3C, 3J, and 3K show the same magnet module 304 with one side of the socket 305 removed so that the entire length of the magnet bolt 306 is visible. Slots 307 would hold the magnets, which are shown as element 320. FIGS. 3D, 3F, and 3G show the magnet level 3 in cross-section. In FIGS. 3D an 3F, the cross-section cuts through the liquid conduits 308 and shows the magnet slots 307 aligned with the liquid conduits 308. FIG. 3E shows the magnet level 3 in a horizontal cross-section so that all ninety six of the magnet slots 307 are visible.

The magnet bolt 306 can be shot by an actuator to a fully inserted position into the socket 305. In the fully inserted position, shown in FIGS. 3A-E, 3H and 3J, two magnets 320 are juxtaposed to each liquid conduit 308. Alternatively, the actuator can move the bolt 306 to a withdrawn position, shown in FIGS. 3G, 3I and 3K. The magnet bolt 306 sits between two lines of twelve liquid conduits. In the embodiment shown, the magnet bolt 306 may contain forty eight magnets, two for each liquid conduit 308, with two discrete magnets 320 in each slot 307. Alternatively, each bolt could include only twelve magnet slots, with two separated magnets in each slot, the magnets reaching horizontally across the bolt so that each magnet can be juxtaposed to two liquid conduits on opposite sides of the bolt 306. The magnet bolt 306 may contain twenty four magnets, with the magnets sized and arranged in the bolt so that when the bolt is shot each magnet is juxtaposed to two liquid conduits, one on each side of the bolt. In other embodiments, different arrangements of magnets are possible.

Figure 4:
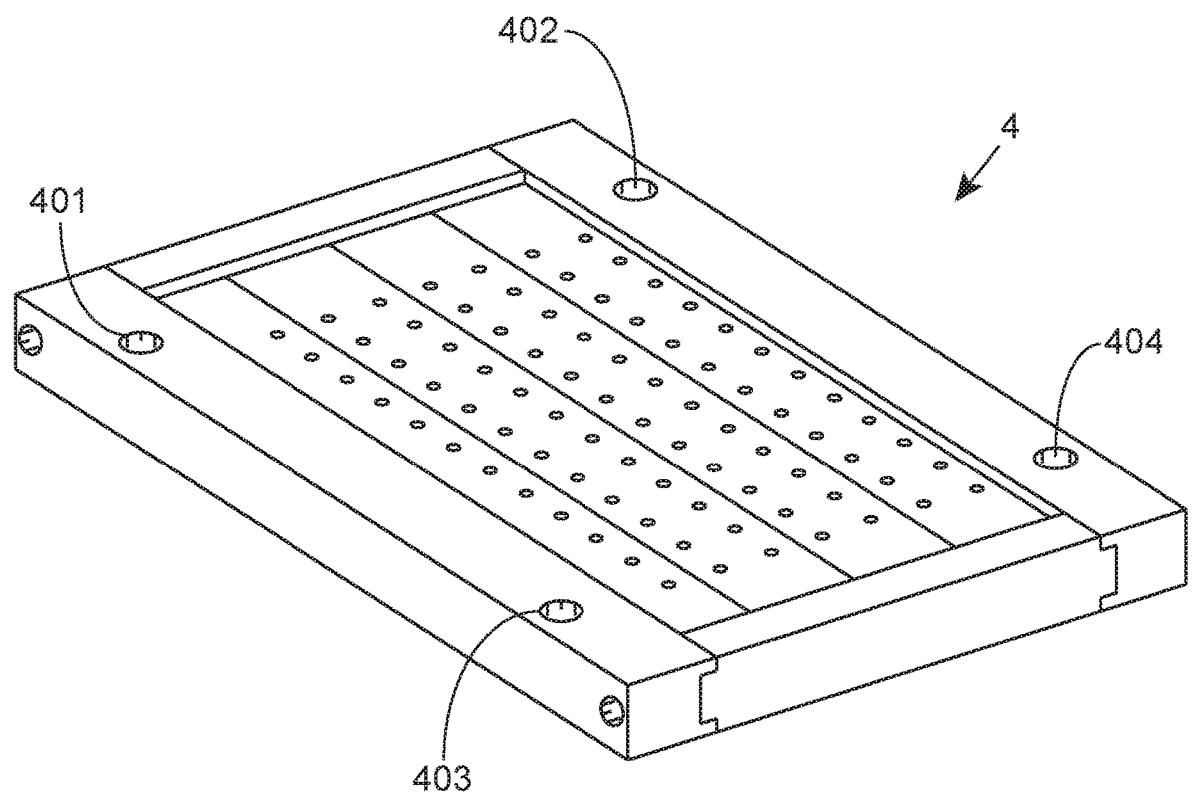
FIG. 4 illustrates the tube guide level of the liquid handling system of FIG. 1.

FIG. 4 illustrates the tube guide level 4. The function of the tube guide level is to keep the liquid conduits straight. Although omitted for clarity, typically the tube guide level 4 will be connected to the magnetic level 3 by four bolts passing through bolt holes 401, 402, 403, 404 and fixedly attached to the tube guide level 4. The bolts are also slidably connected to the magnetic level 3. The tube guide level 4 is present to properly align the tips of the liquid conduits with the wells of a multi-well plate. In some cases, precise control of the depth of each of the liquid conduit tips can be important. To aid in such precise control, the tube guide level 4 and the magnetic level 3 can be allowed to slide relative to one another so that the tube guide level 4 can be lowered down to make direct contact with the top surface of the multi-well plate. In addition, each bolt may be surrounded by a spring that biases the tube guide level upward toward the magnetic level 3. In this way, when the system is finished interacting with a multi-well plate, the tube guide level 4 will retract toward the magnetic level 3.

A system like the one shown in FIGS. 1-4 can be used as follows. Magnetic bead solution is aspirated from a standard Society for Bimolecular Screening (SBS) plate into the liquid conduits, and then dispensed from the liquid conduits so as to form a number of composite liquid cells (CLCs).

The CLCs are typically retained on a platform such as a thermal chip, where they can be incubated according to a predetermined protocol. After incubation, each CLC, including the magnetic bead solution, is aspirated into one of the liquid conduits, followed by a wash buffer, air, encapsulating oil, an elution buffer and more encapsulating oil. According to the particular protocol in question, volumes from 1 to 50 μl of each buffer are typically aspirated. The magnet or magnets are then engaged. The sample is flowed past the magnetic arrangement, thus capturing the beads. The fluids continue to flow, so that the immobilized beads are exposed to the wash buffer, air encapsulating oil and elution buffer. The flow is reversed once the elution buffer passes the immobilized beads. The flow is then reversed again, exposing the immobilized beads to the elution buffer a second time, after which each elution buffer is dispensed from each liquid conduit. The magnets are then disengaged, releasing the magnetic beads into the wash buffer. The wash buffer is then dispensed into a waste location.

More generally, a system can comprise a plurality of liquid conduits, each liquid conduit defining a flow axis. Each liquid conduit may have a proximal end and a distal end, the ends spaced apart along the flow axis. For each liquid conduit, one, two or more magnets can be associated with the liquid conduit, the two or more magnets may be spaced apart from one another in a direction parallel to the flow axis defined by the associated liquid conduit. The two or more magnets can, for example be two, three, four, five or more magnets. At least one actuator can be associated with the magnets, the at least one actuator being capable of causing each magnet to assume either a first position in which the magnet is separated from the associated liquid conduit in a direction perpendicular to the flow axis defined by the associated liquid conduit, or a second position in which the magnet is juxtaposed to the associated liquid conduit. The flow axes of the plurality of liquid conduits are all parallel to one another. The liquid conduits can be spaced apart from one another in a plane perpendicular to the parallel flow axes of the plurality of liquid conduits, for example in a two dimensional pattern in the plane, such as rectangular or hexagonal packing. The liquid conduits can be spaced apart in one or more lines. The liquid conduits may or may not be capillary tubes.

The system can also include at least one pump operably connected to a plurality of liquid conduits such that activation of the at least one pump can create either a negative or a positive pressure within at least one of the plurality of liquid conduits. The system can include a plurality of pumps with each liquid conduit operably connected to exactly one of the plurality of pumps. Each of the pumps can be operably connected to four of the plurality of liquid conduits. Alternatively, the system could include only a single pump operably connected to all the liquid conduits.

The system can include a controller operably connected to both the pump or pumps and the actuator or actuators, where the controller is programmed to (1) activate one or more pumps so as to create a negative pressure within one of the plurality of liquid conduits, thereby drawing into the liquid conduit a liquid containing magnetic beads, (2) activate one or more actuators, thereby causing the two magnets associated with one or more of the plurality of liquid conduits to go from the first position to the second position, and (3) activate the pump so as to create a pressure that moves the aqueous liquid past the two magnets.

The system can include one or more actuators. There may be exactly one actuator for each magnet, or there may a single actuator associated with a plurality of liquid conduits, and each liquid conduit being associated with only one actuator. Each magnet can be associated with one liquid conduit, two liquid conduits, or more liquid conduits.

In some embodiments, the system can include a manifold in fluid communication with the proximal end of each liquid conduit such that each liquid conduit is in fluid communication with at least one other liquid conduit through the manifold. For example, each liquid conduit can be in fluid communication with one, two, three or more other liquid conduits.

In some embodiments, the system can include a tube guide operably attached to the distal end of each fluid conduit, the tube guide being adapted to direct each distal end of each fluid conduit to a predetermined position. In some embodiments such systems can include a tube guide controller operably attached to the tube guide, the tube guide controller programmed to position the tube guide such that the tube directs each distal end of each fluid conduit to a predetermined position. In some such systems the predetermined positions for each distal end of each fluid conduit are arranged such that the distal end of each fluid is aligned predetermined locations on a substrate having stabilization features adapted to immobilize composite liquid cells, or some other beneficial substrate, e.g., a multi-well plate.

In certain embodiments, the system may be used for purification. In certain embodiments, purification may be performed upstream of quantitative PCR when analyzing samples such as blood, saliva, or urine for viral pathogens. In order to achieve the sensitivity required to accurately screen patient samples for viral infections such as HIV, Hepatitis, and many more, it is necessary to purify the viral RNA or DNA from the sample. There remains a large level of difficulty to concentrate large input samples into small sample volumes for detection with PCR. Such systems making use of magnetic separation may be used in a wide variety of biochemistry processes, e.g., pyro-sequencing, nucleic acid ligation, PCR, digital PCR, qPCR, nucleic acid sequencing, protein detection/enrichment, genetic bead coating rare cell detection, and cell enrichment, etc.

In some embodiments, the system can aspirate sample liquids, such as blood, saliva, or urine, directly from an original sample vessel.

We claim:

1. A system comprising:
   a plurality of liquid conduits, each liquid conduit defining a longitudinal axis;
   for each liquid conduit, at least two magnets associated with the liquid conduit, the at least two magnets spaced apart from one another in a direction parallel to the longitudinal axis defined by the associated liquid conduit; and
   a slidably displaceable unit holding the at least two magnets wherein the slidably displaceable unit positions each magnet in either a first position in which each magnet is separated from the associated liquid conduit in a single direction perpendicular to the longitudinal axis defined by the associated liquid conduit, or a second position in which each magnet is juxtaposed to the associated liquid conduit.

2. The system of claim 1, wherein the longitudinal axes of the plurality of liquid conduits are all parallel to one another.

3. The system of claim 2, wherein the plurality of liquid conduits are spaced apart from one another in a plane perpendicular to the parallel longitudinal axes of the plurality of liquid conduits.

4. The system of claim 3, wherein the plurality of liquid conduits comprises at least three liquid conduits spaced apart in a two dimensional pattern in the plane perpendicular to the parallel longitudinal axes of the plurality of liquid conduits.

5. The system of claim 3, wherein the plurality of liquid conduits are spaced apart in a line in the plane perpendicular to the parallel longitudinal axes of the plurality of liquid conduits.

6. The system of claim 1 wherein the liquid conduits are capillary tubes capable of drawing in an aqueous solution by capillary action.

7. The system of claim 1, wherein at least one of the plurality of liquid conduits comprises either a negative or a positive pressure applied within the at least one of the plurality of liquid conduits.

8. The system of claim 7 wherein four of the plurality of liquid conduits comprise either a negative or a positive pressure applied within the four of the plurality of liquid conduits.

9. The system of claim 7,
wherein the one of the plurality of liquid conduits comprises a negative pressure applied within the one of the plurality of liquid conduits that draws into the liquid conduit a liquid containing magnetic beads.

10. The system of claim 9, wherein the one of the plurality of liquid conduits comprises a pressure applied within the one of the plurality of liquid conduits that moves the liquid past the two magnets associated with the one of the plurality of liquid conduits.

11. The system of claim 1 wherein each magnet is associated with exactly one liquid conduit.

12. The system of claim 1 wherein each magnet is associated with exactly two liquid conduits.

13. The system of claim 1 wherein each magnet is associated with more than two liquid conduits.

14. The system of claim 1 wherein the at least two magnets are exactly three magnets.

15. The system of claim 1 wherein:
each liquid conduit has a distal end and proximal end spaced apart along the longitudinal axis;
the system further comprising a manifold in fluid communication with the proximal end of each liquid conduit such that each liquid conduit is in fluid communication with at least one other liquid conduit through the manifold.

16. The system of claim 15 wherein each fluid conduit is in fluid communication with exactly one other fluid conduit through the manifold.

17. The system of claim 15 wherein each fluid conduit is in fluid communication with exactly two other fluid conduits through the manifold.

18. The system of claim 15 wherein each fluid conduit is in fluid communication with exactly three other fluid conduits through the manifold.

19. The system of claim 1 further comprising a tube guide operably attached to the distal end of each fluid conduit, the tube guide being adapted to direct each distal end of each fluid conduit to a predetermined position.

20. The system of claim 19 further comprising a tube guide controller operably attached to the tube guide, the tube guide controller programmed to position the tube guide such that the tube directs each distal end of each fluid conduit to a predetermined position.

21. The system of claim 20 wherein the predetermined positions for each distal end of each fluid conduit are arranged such that the distal end of each fluid conduit is aligned predetermined locations on a substrate having stabilisation features adapted to immobilize composite liquid cells.

22. The system of claim 1, wherein the slidably displaceable unit comprises at least one slot to hold at least one magnet.

* * * * *